United States Patent [19]
Trube et al.

[11] 3,898,921
[45] Aug. 12, 1975

[54] AIR NOZZLE FOR VENTING SYSTEMS

[75] Inventors: Hans Trube, Sindelfingen; Hermann Grimm, Ostelsheim; Gernot Karioth, Sindelfingen, all of Germany

[73] Assignee: Daimler-Benz Aktiengesellschaft, Germany

[22] Filed: Oct. 27, 1972

[21] Appl. No.: 301,293

[30] Foreign Application Priority Data
Oct. 28, 1971 Germany............................ 2153743

[52] U.S. Cl.......................... 98/40 A; 49/64; 49/67; 98/40 VM; 98/110; 98/121 A
[51] Int. Cl.............................................. F24f 13/06
[58] Field of Search .. 98/40 V, 40 VM, 110, 121 R, 98/121 A, 40 A; 49/61, 63, 64, 67

[56] References Cited
UNITED STATES PATENTS

| | | |
|---|---|---|
| 1,254,216 | 1/1918 | Draws ............................. 98/121 A |
| 2,761,372 | 9/1956 | Griner ............................ 98/40 VM |
| 2,847,928 | 8/1958 | Glass ................................. 98/40 V |
| 2,969,725 | 1/1961 | Grace et al. ......................... 98/110 |
| 3,103,155 | 9/1963 | Boylan et al. ...................... 98/40 A |
| 3,461,791 | 8/1969 | Beyer ............................... 98/40 A |
| 3,635,245 | 1/1972 | Canfield ............................ 98/38 B |
| 3,680,470 | 8/1972 | Neece ............................. 98/121 A |

*Primary Examiner*—William F. O'Dea
*Assistant Examiner*—Ronald C. Capossela
*Attorney, Agent, or Firm*—Craig & Antonelli

[57] ABSTRACT

An air nozzle for a ventilating system, especially for the ventilating system of a vehicle which includes an adjustable Venetian-blind type shutter accommodated in the discharge aperture of a housing which, in its rearward part includes an air valve for the control of the air quantity; the air valve is thereby adapted to be opened and closed by means of a slider member movable transversely to the discharge aperture.

38 Claims, 3 Drawing Figures

PATENTED AUG 12 1975 3,898,921

AIR NOZZLE FOR VENTING SYSTEMS

The present invention relates to an air nozzle for a ventilating installation, especially for the ventilating installation of a vehicle, which includes an adjustable Venetian-blind-type shutter or louver.

Such types of air nozzles are used, for example, in passenger motor vehicles and have the task to conduct heated air, fresh air or cooled air from the ventilating device or air-conditioning box into the vehicle interior. It is known to utilize a roller-shaped louver or shutter which is inserted into an aperture or recess of the instrument panel of a motor vehicle. This roller-shaped louver or shutter is pivotal about a horizontal axis in the upward and downward direction Additionally, the slats of the louver or shutter can be pivoted in unison about approximately vertical axes so that altogether the discharged air can be deflected nearly into any desired direction. In one end position the slats of the shutter or louver abut against one another so that the discharge cross section is closed. However, the slats or lamellae do not close particularly tightly so that only the main air masses of the venting installation can be held back In order to obtain a good sealing by means of lamellae or slats, a manufacturing expenditure would have to be provided which is in no economic relation to the success to be expected. However, if no tight closure is produced then there exists the danger that unpleasant draft appearances occur in the spce to be ventilated, especially in the vehicle interior.

The present invention is concerned with the task to provide an air nozzle of the aforementioned type which can be tightly closed. The present invention essentially consists in that the louver or shutter is accommodated in the discharge opening of a housing which in its rearward portion contains an air valve for regulating the air quantity which is adapted to be opened and closed by means of a slider member movable transversely to the discharge aperture. The air valve permits an accurate metering of the desired air quantity and an absolutely tight closure of the air nozzle. It is thereby particularly favorable that a slider member displaceable transversely to the discharge aperture is provided because this construction corresponds to the safety requirements which are established in connection with motor vehicles to the effect that levers used thereat do not move into the vehicle interior in case of an adjustment beyond their starting or normal position.

In a structurally advantageous embodiment of the present invention, the part of the housing receiving the roller-shaped louver or shutter has a rectangular cross section and the part of the housing containing the air valve a round cross section. In this embodiment it is possible in a simple manner to mount a heating hose or the like leading to the air nozzle on the round part. In order to create a secure mounting of the shutter or louver, without having to use screws or the like, it is favorable if the shutter or louver is clipped into the housing.

According to a further feature of the present invention, provision is made that the air valve preferably enclosed with a rubber profile has an eliptical configuration. It is achieved thereby that already relatively small displacement movements of the air valve are sufficient for opening up a large air flow cross section.

It is structurally advantageous if the slider member is provided with two rollers arranged at a distance to one another in the displacement direction, which run in a U-shaped guide rail. It is assured in this manner that the slider member moves easily and is accurately guided nonetheless without the danger that it may cant or tilt. In order to secure the position of the slider member, it is appropriate if the leg portions of the guide rail are directed toward the housing which is provided within this area with a slider guidance.

In order to prevent with certainty that the air valve can automatically open as a result of vibrations, shocks or the like, provision is made according to a further feature of the present invention that the slider member is connected with the air valve by way of a transmission linkage which includes an over-dead-center point safety mechanism. An advantageous embodiment of the present invention provides that the slider member is connected, movable transversely to the displacement direction, with an actuating lever pivotal about a pin, on which is pivotally connected by way of a joint a connecting lever which in turn is connected by way of a joint with the valve lever that is non-rotatably arranged on a shaft of the air valve. In order to obtain with this construction an over-dead-center point safety action, provision is made that in the closing position of the air valve the pin is disposed on the side of the connecting lever facing the slider member. It is assured thereby that the forces acting on the air valve cannot be transmitted in the opening direction onto the slider member.

In a particularly advantageous embodiment of the present invention, the housing is made as plastic molded part, particularly as injection-molded part made from synthetic resinous material, and is provided with molded-on pins and slider guidances preferably on mutually opposite sides. This housing which can be manufactured in a relatively economic manner is suited in the preferred construction thereof to be used both on the right-hand side and left-hand side, for example, in a passenger motor vehicle.

Accordingly, it is an object of the present invention to provide an air nozzle for a ventilating system which avoids by simple means the aforementioned shortcomings and drawbacks encountered in the prior art.

Another object of the present invention resides in an air nozzle for a ventilating installation which permits a tight closing without involving expensive means.

A further object of the present invention resides in an air nozzle for ventilating systems which eliminates the danger of unpleasant drafts, especially on the inside of the vehicle while at the same time permitting an accurate metering of the desired air quantity to pass through the nozzle.

Still another object of the present invention resides in an air nozzle for heating and air conditioning systems which offers a simple, advantageous construction coupled with great versatility as well as simple installation.

A still further object of the present invention resides in an adjustable air nozzle for ventilating installations of vehicles, especially passenger motor vehicles which assures easy adjustability of the parts thereof, elimination of rattling noises, as well as inadvertent opening of the air nozzle.

Another object of the present invention resides in an air nozzle which can be preassembled prior to final installation in the vehicle.

These and other objects, features and advantages of the present invention will become more apparent from the following description when taken in connection with the accompanying drawing which shows, for purposes of illustration only, one embodiment in accordance with the present invention, and wherein.

Figure 1:
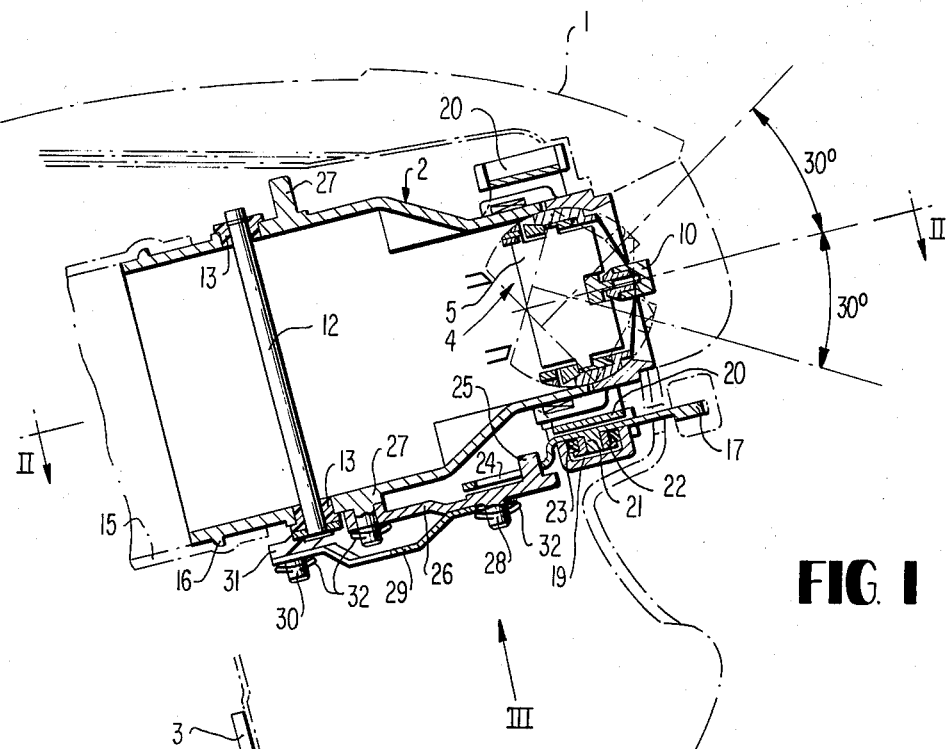
FIG. 1 is a vertical cross-sectional view through an air nozzle according to the present invention arranged in an instrument panel of a passenger motor vehicle.
Figure 2:
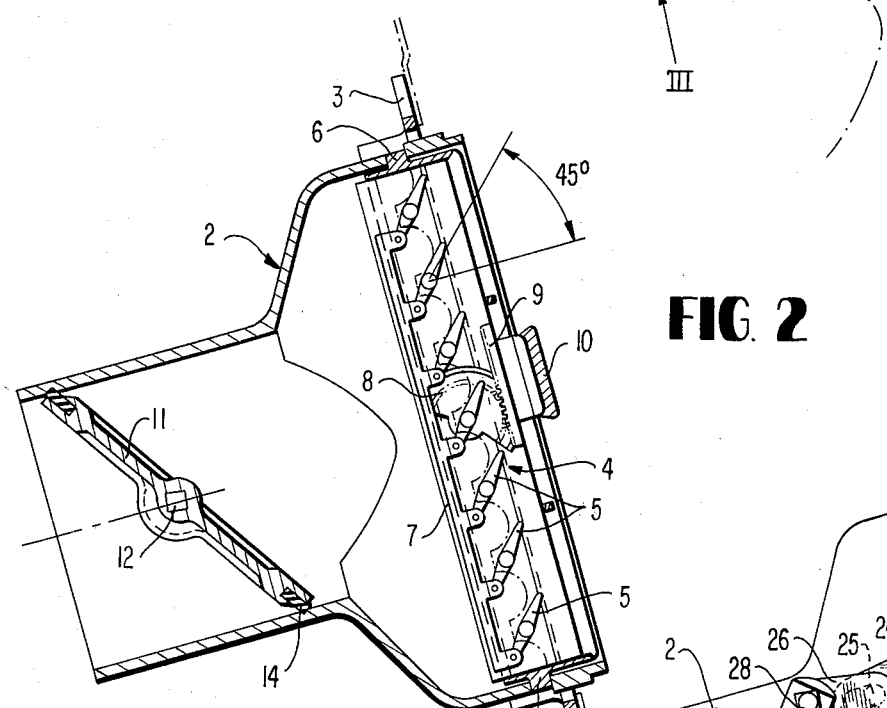
FIG. 2 is a cross-sectional view taken along line II—II of FIG. 1.

Referring now to the drawing wherein like reference numerals are used throughout the various views to designate like parts, the illustrated air nozzle belongs to a ventilating installation of a passenger motor vehicle and is arranged with a slight inclination directed slightly upwardly on the inside of an instrument panel 1 illustrated in its contours in dash and dot lines. The air nozzle consists of a housing generally designated by reference numeral 2 which, within the area of its discharge aperture, is provided with lateral tabs (FIGS. 2 and 3) which are adapted to be secured by means of screws or the like from the inside at a sheet metal member of the instrument panel 1. The part of the housing 2 on the side of the air discharge possesses a flat, rectangular cross section. A roller-shaped Venetian-blind-type louver or shutter generally designated by reference numeral 4 (FIGS. 1 and 2) is inserted into this part of the housing 2. The roller-shaped shutter 4 includes several adjustable lamellae or slats 5. The roller-shaped shutter 4 is pivotal in the upward and downward direction through an angle of approximately 30° about a horizontal axis which is constituted by two pins 6 (FIG. 2). The pins 6 are supported in the housing 2. The lamellae or slats 5 are rotatably supported respectively in their center and are pivotally connected with each other at their end by a connecting rod 7 (FIG. 2). The center slat 5 is non-rotatably connected with an approximately hemispherically shaped toothed disk 8 for rotation in unison therewith, with which meshes a toothed rack 9 of a slider member 10 which is displaceably arranged on the front side of the shutter or louver 4. The slats 5 are adjustable about their approximately vertical axes through about 45° with the aid of this slide member 10 whereas they can be adjusted toward the other side to such an extent that they abut against one another.

Figure 3:
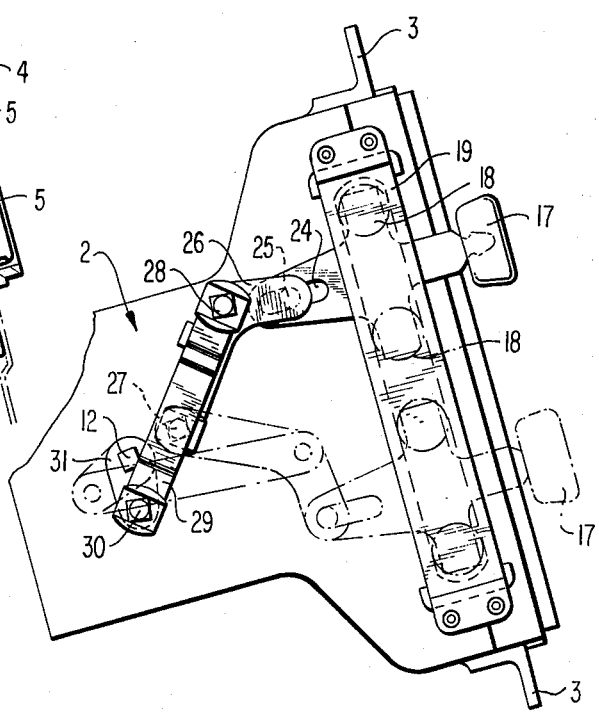
FIG. 3 is an elevational view of the air nozzle in accordance with the present invention taken in the direction of arrow III of FIG. 1.

The part of the housing 2 disposed on the air inlet side has a cylindrical configuration. An air valve 11 (FIG. 2) is arranged in this part; the air valve 11 has an oval configuration and is rotatable with the aid of an approximately vertical extending square shaft 12 (FIGS. 1–3). The square shaft 12 is supported in the housing 2 by means of plastic bushes 13 (FIG. 1). The air valve 11 is additionally enclosed or surrounded by a rubber profile 14 serving as seal. It is achieved by the use of an oval or eliptical air valve 11 that an adjusting angle of approximately 45° suffices in order to displace the air valve from the closed position illustrated in FIG. 2 into the open position in which the air valve 11 extends in the longitudinal direction of the cylindrical part of the housing 2. The air valve 11 permits an accurate regulation of the air quantity discharged from the air nozzle and additionally enables a complete closing so that undesired draft appearances can be prevented with certainty.

As is indicated in dash and dot lines in FIG. 1, a heating tube 15 constructed for the most part of undulated shape can be mounted on the cylindrical part of the housing 2. Several molded-on barbs 16 or the like are thereby provided at the outer circumference of the housing 2 which secure the hose 15.

The adjustment of the air valve 11 takes place by way of a slider member 17 (FIGS. 1 and 3) which slightly projects beyond the front side of the instrument panel 1 and is displaceably guided transversely to the discharge aperture of the housing 2. The slider member 17 includes two rollers 18 (FIG. 3) arranged at a distance in the displacement direction, which run in a U-shaped guide rail 19. The U-shaped guide rail 19 is secured at the bottom side of the housing 2 in such a manner that it points with its legs toward the housing 2. The securing takes place at a slide guidance 20 of the housing 2. The slider member 17 abuts at the slide guidance 20 while its rollers 18 arranged on one side run in the guide rail 19.

Pins 21 (FIG. 1) are provided on the slider member 17 on which are mounted the rims or fellies 22 which are angularly shaped in cross section. These rims or fellies 22 accommodate nylon rings 23 serving as tires.

The connection between the slider member 17 and the shaft 12 of the air valve 11 takes place by way of a transmission linkage which transmits and converts the transversely directed displacement movement of the slider member 17 into a pivot movement and which additionally includes an over-dead-center safety action for the closed position of the air valve 11 so that in particular the elastic forces of the rubber profile 14 cannot effect an automatic opening of the air valve 1.

The slider member 17 is provided within the area of its end extended beyond the guide rail 19 with an elongated aperture 24 (FIG. 3) disposed perpendicularly to its displacement direction, into which engages a pin 25 (FIGS. 1 and 3) of an actuating lever 26. The actuating lever 26 is rotatably supported on a fixed pin 27 of the housing 2. An outwardly directed pin 28 is provided between the pins 25 and 27 of the actuating lever 26, which pivotally receives a connecting lever 29. The connecting lever 29 which is cranked or offset downwardly for purposes of by-passing the pin 27 is connected with a pin 30 of a valve lever 31 which in its turn is non-rotatably connected with the shaft 12 of the air valve 11 for rotation in unison therewith. All levers are secured on the pins by means of spring washers or lock washers 32 whereby at the same time any tendency on the part of the transmission linkage to rattle is effectively precluded.

The position of the slider member 17 and of the transmission linkage is illustrated in FIG. 3 in full line which corresponds to the closed position of the air valve 11 illustrated in FIG. 2. In this position, the fixed pin 27, about which the actuating lever 26 is pivotal, is disposed on the side of the connecting lever 29 facing the slider member 17, i.e., outside of the line of connection between the pins 28 and 30 so that an over-dead-center position safety action is created providing a toggle-type actuation.

The housing 2 is made in the illustrated embodiment as plastic molded part, particularly as injection-molded part using conventional plastic material such as synthetic resinous material. The pins 27 and the slide guidance 20 are thereby molded on to the housing 2. Since such molding-on of the pins 27 and of the slider guidance 20 does not involve any significant expenditures, a corresponding pin 27 and a corresponding slider guidance 20 are molded-on additionally on the diametrically opposite side of the housing 2 so that the illustrated air nozzle can be equipped without difficulty with the slider member 17 and the transmission linkage on the opposite side. This is appropriate, for example, when in motor vehicles air nozzles are used for the right and left side whose louvers or shutters 4 are to permit certain adjusting angles corresponding to the vehicle side.

The illustrated air nozzle according to the present invention realizes a compact and space-saving construction whereby the air cross section can be effectively controlled. Additionally, a saving in fastening and securing materials at the instrument panel 1 is realized since only the housing 2 has to be fastened thereat. Since the air nozzle forms a structural unit, the accurate adjustment of the lamellae or slats 5 and of the air valve 11 can be realized in a preassembly location prior to the final installation.

The slider guide means 20 molded-on integrally at the top and at the bottom considerably contributes to the form stability of the entire housing in order that the roller-shaped shutter or lourver 4 does not touch or contact with the narrow given tolerances.

The illustrated air nozzle can be used in various ventilating installations. It is used in particular in motor vehicles whereby it is arranged in the instrument panel or instrument table at approximately chest height of the passengers present in the vehicle. Of course, it is also possible to use such an air nozzle in ventilating installations of railroad vehicles, air crafts or passenger ships.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An air nozzle for a ventilating installation, which includes an adjustable shutter means, characterized in that a housing means having an inlet and discharge aperture is provided, adjustment means for adjusting the shutter means, the shutter means is accommodated in the discharge aperture of the housing means, the housing means includes an air valve means disposed in said housing between the inlet and the shutter means for regulating the air quantity discharged from the air nozzle, valve control means operatively connected with said air valve means for opening and closing the same, said valve control means includes an actuating member disposed at the discharge aperture, and means for slidably mounting said actuating member to be movable transversely to the air discharge aperture.

2. An air nozzle according to claim 1, characterized in that the part of the housing means accommodating the shutter means has a substantially rectangular cross section and the part of the housing means containing the air valve means has a substantially circular cross section.

3. An air nozzle according to claim 2, characterized in that the shutter means is a roller-shaped shutter means.

4. An air nozzle according to claim 2, characterized in that means are provided for holding the shutter means in the housing means by snap action.

5. An air nozzle according to claim 2, characterized in that the air valve means has an approximately eliptical configuration.

6. An air nozzle according to claim 5, characterized in that the air valve means is surrounded by an elastic profile.

7. An air nozzle according to claim 5, characterized in that the means for mounting the actuating member includes two roller means arranged at a distance from one another in the displacement direction, said roller means running in a substantially U-shaped guide rail.

8. An air nozzle according to claim 7, characterized in that the leg portions of the U-shaped guide rail point in the direction toward the housing means which is provided within this area with a slide guide means for guiding the sliding movement of the actuating member.

9. An air nozzle according to claim 8, characterized in that the actuating is connected with the air valve means by way of a transmission linkage which includes an over-dead-center point safety means.

10. An air nozzle according to claim 9, characterized in that the actuating member is connected with an actuating lever pivotal about a pin so as to permit relative movement therebetween transversely to the displacement direction of the actuating member, a connecting lever being pivotally connected with the actuating lever by way of a joint means, said connecting lever being connected by way of a joint means with a valve lever which is non-rotatably mounted on a shaft of the air valve means.

11. An air nozzle according to claim 10, characterized in that in the closed position of the air valve means the pin about which the actuating lever is pivotal, is disposed on the side of the connecting lever facing the actuating members.

12. An air nozzle according to claim 11, characterized in that the housing means is made as plastic molded part with molded-on pin means and slide guide means.

13. An air nozzle according to claim 12, characterized in that the housing means is constructed as synthetic resinous injection-molded part having pin and slide guide means molded integrally therewith.

14. An air nozzle according to claim 13, characterized in that the housing means is provided with a molded-on pin means and slide guide means on mutually opposite sides thereof.

15. An air nozzle according to claim 14, in a motor vehicle including an instrument panel and ventilating system, characterized in that the housing means is secured in the instrument panel and forms part of the ventilating system.

16. An air nozzle according to claim 15, characterized in that the shutter means is a roller-shaped shutter means.

17. An air nozzle according to claim 16, characterized in that the shutter means includes slats pivotal about axes disposed substantially perpendicularly to the pivot axis of the shutter means.

18. An air nozzle according to claim 17, characterized in that the air valve means is surrounded by an elastic profile.

19. An air nozzle according to claim 1, characterized in that the air valve means has an approximately eliptical configuration.

20. An air nozzle according to claim 19, characterized in that the air valve means is surrounded by an elastic profile.

21. An air nozzle according to claim 1, characterized in that the means for mounting the actuator member includes two roller means arranged at a distance from one another in the displacement direction, said roller means running in a substantially U-shaped guide rail.

22. An air nozzle according to claim 21, characterized in that the leg portions of the U-shaped guide rail point in the direction toward the housing means which is provided within this area with a slide guide means for guiding the sliding movement of the actuator member.

23. An air nozzle according to claim 1, characterized in that the slide means is connected with the air valve means by way of a transmission linkage which includes an over-dead-center point safety means.

24. An air nozzle according to claim 23, characterized in that the actuating member is connected with an actuating lever pivotal about a pin so as to permit relative movement therebetween transversely to the displacement direction of the actuating member, a connecting lever being pivotally connected with the actuating lever by way of a joint means, said connecting lever being connected by way of a joint means with a valve lever which is non-rotatably mounted on a shaft of the air valve means.

25. An air nozzle according to claim 24, characterized in that in the closed position of the air valve means the pin about which the actuating lever is pivotal, is disposed on the side of the connecting lever facing the actuating member.

26. An air nozzle according to claim 1, characterized in that the housing means is made as plastic molded part with molded-on pin means and slide guide means.

27. An air nozzle according to claim 26, characterized in that the housing means is constructed as synthetic resinous injection-molded part having pin and slide guide means molded integrally therewith.

28. An air nozzle according to claim 27, characterized in that the housing means is provided with a molded-on pin means and slide guide means on mutually opposite sides thereof.

29. An air nozzle according to claim 1 in a motor vehicle having an instrument panel and a ventilating system, characterized in that the housing means is secured in the instrument panel and forms part of the ventilating system.

30. An air nozzle for a ventilating installation, which includes an adjustable shutter means, characterized in that the shutter means is accommodated in a discharge aperture of a housing means which includes in its rearward part an air valve means for regulating the air quantity, and valve control means movable substantially transversely to the air discharge aperture and operatively connected with said air valve means for opening and closing the same, the part of the housing means accommodating the shutter means has a substantially rectangular cross section and the part of the housing means containing the air valve means has a substantially circular cross section, the shutter means is a roller-shaped shutter means, and in that the shutter means includes slats pivotal about axes disposed substantially perpendicularly to the pivot axis of the shutter means.

31. An air nozzle arrangement comprising: a housing having inlet and discharge ends, a plurality of louver means disposed at said discharge end of said housing for directing the air flow from the nozzle arrangement, a first means for adjustably mounting said plurality of louver means about a first axis, a second means separate from said first means for adjustably mounting said plurality of louver means about a second axis substantially perpendicular to said first axis, valve means disposed in said housing upstream of said discharge end for controlling the quantity of air flowing through said discharge end, and means operatively connected with said valve means for selectively opening and closing the same to control the air flow through the nozzle arrangement, said valve means includes a main body portion and a sealing portion, said sealing portion including elastic means disposed about the periphery of said body portion, said means for selectively opening and closing said valve means includes a guide rail means provided on said housing at the discharge end extending transversely thereof, actuator means having a portion received in and guided by said guide rail means, and linkage means operatively connecting said actuator means with said valve means.

32. An arrangement according to claim 31, wherein said actuator means includes a slider member having a first and second end portion, said first end portion extending beyond said discharge end of said housing, said second end portion being provided with a means for connecting said slider member with said linkage means.

33. An arrangement according to claim 32, wherein said portion of said actuator means received in and guided by said guide rail means includes a pin provided on said slider member between said first and second end portions.

34. An arrangement according to claim 33, wherein said means for connecting said slider member with said linkage means includes an elongated aperture provided in said second end portion, said linkage means including a pin portion receivable in said elongated aperture.

35. An arrangement according to claim 34, wherein said linkage means includes a first lever having one end thereof pivotally mounted on said housing, the other end of said first lever being provided with said pin portion receivable in said elongated aperture provided in said slider member, and a second lever operatively connecting said first lever with said valve means.

36. An arrangement according to claim 35, wherein said first lever is provided with a second pin portion, said second lever having on one end thereof an aperture for receiving said second pin portion, the other end of said second lever being connected with said valve means to cause selective displacement thereof in response to movement of said slider means.

37. An arrangement according to claim 36, wherein said first means for adjustably mounting said plurality of louver means includes a connecting rod operatively connected with each of aid louver means, and actuator means operatively interconnected with said connecting rod to cause selective displacement of said louver means.

38. An arrangement according to claim 37, wherein said actuator means operatively interconnected with said connecting rod includes a toothed rack means fixedly connected with at least one of said plurality of louver means, and a slider member provided with a toothed portion engageable with said toothed rack means to cause rotation of said louver means in unison upon displacement of said last-mentioned slider member.

* * * * *